United States Patent [19]

Sun et al.

[11] Patent Number: 6,148,248
[45] Date of Patent: Nov. 14, 2000

[54] APPARATUS AND METHOD FOR LOBING AND THERMAL-DAMAGE CONTROL IN SHOE CENTERLESS GRINDING

[75] Inventors: Yunquan Sun; Zhongxue Gan, both of Storrs, Conn.

[73] Assignee: Zhongxue Gan, Storrs, Conn.

[21] Appl. No.: 08/982,733

[22] Filed: Dec. 2, 1997

[51] Int. Cl.[7] .................................................. G06F 7/66
[52] U.S. Cl. .............................. 700/164; 700/160; 451/5; 451/11
[58] Field of Search ..................................... 700/164, 160, 700/95, 97, 148, 150, 156, 165, 178, 182, 192, 204, 205, 222; 451/7, 8, 21, 25, 5, 11

[56] References Cited

U.S. PATENT DOCUMENTS

| | | | |
|---|---|---|---|
| 3,601,931 | 8/1971 | Hahn | 451/28 |
| 3,694,969 | 10/1972 | Hahn et al. | 451/25 |
| 3,745,710 | 7/1973 | Hahn et al. | 451/21 |
| 4,055,027 | 5/1990 | Fressi | 451/11 |
| 4,926,603 | 5/1990 | Frost et al. | 451/5 |
| 5,174,070 | 12/1992 | Lösch et al. | 451/7 |
| 5,643,051 | 7/1997 | Zhou et al. | 451/11 |
| 5,682,331 | 10/1997 | Berlin | 702/150 |
| 5,691,921 | 11/1997 | Berlin | 702/99 |
| 5,759,085 | 7/1998 | Gugenheimer et al. | 451/8 |

OTHER PUBLICATIONS

Kugi et al., "active Compensation of Roll Eccentricity in Rolling Mills", IEEE, pp. 2199–2206, vol. 3, 1998.

Conroy, "Modern Cement Plant Desgn with a View to Efficiency and the Environment", IEEE, pp. 542–552, May 1995.

Primary Examiner—William Grant
Assistant Examiner—McDieunel Marc
Attorney, Agent, or Firm—McCormick, Paulding & Huber LLP

[57] ABSTRACT

A control system by which, the lobing and thermal-damage on a component surface will be eliminated and a component of a circular cross-section is capable of being ground with ultra-precision and high quality surface finish. The system includes (i) an automatic controlled supporting device, by which the periphery support of circular component of any size is auto-formed in a most stable work-holding condition; (ii) a flexible rear-shoe with active filtering mechanism, by which the high frequency lobing will be removed and the heat generated in the contact area between the workpiece and rear-shoe will be reduced by the self-lubrication of rear-shoe; (iii) an on-line vision-based temperature monitoring and control device, by which the overheat on the workpiece is controlled; (iv) an on-line phase precession lobing control algorithm, by which the lobing will be effectively suppressed in a rounding process.

5 Claims, 5 Drawing Sheets

APPARATUS AND METHOD FOR LOBING AND THERMAL-DAMAGE CONTROL IN SHOE CENTERLESS GRINDING

FIELD OF INVENTION

This invention is related to a device for lobing and thermal-damage control in shoe centerless grinding. More particularly, to such apparatus wherein the lobing and thermal-damage on the component surface will be eliminated and a component of circular cross-section can be ground with ultra-precision and high quality surface finish in centerless grinding.

BACKGROUND OF INVENTION

Shoe centerless grinding is a widely used process for the finishing of precision cylindrical components. However, there are two problems in shoe centerless grinding which are (1) waviness due to lobing and chatter, (2) thermal-damage resulting from overheat at the contact area between the rear-shoe and workpiece. Current shoe centerless grinding machine applied in industry can not resolve these problems due to the following reasons:

(1) The geometric setup is manually operated and not accurate. The workpiece quality depends on the operator's experience.

(2) Pivot-structure of the shoes causes support stiffness reduction and introduces more waviness.

(3) Stiff rear-shoe structure results in full geometric error feedback to the cutting point and heat accumulation in the contact area between the workpiece and the rear shoe.

(4) The process parameter configuration is not effective in suppressing lobing and chatter.

Industrial and academic researchers have made much contribution to resolving these problems. Currently, two lobing control methods are geometric setup selection in which the (α-β) cloud diagram is a very popular tool, and speed control in which the wheel speed variation or work speed adjustment is used to suppress lobing. However, there is no approach so far that can provide a lobing-free operation.

For thermal-damage problem, there has been little attention from the academia. Some methods used in industry to lower the temperature include cooling, reducing the contact area between the shoe and workpiece or reducing the grinding force. Unfortunately a decrease in contact area will cause a lobing problem and a smaller grinding force decreases the productivity.

There has been no effective solution to the lobing and thermal problems in shoe centerless grinding. A device which can overcome both problems is needed to obtain high quality circular components.

SUMMARY OF THE INVENTION

The present invention provides a means which can simultaneously eliminate the lobing and thermal-damage on the component surface and grind a component of circular cross-section with ultra-precision and high surface finish.

The first objective of the present invention is to provide an automatic device to optimally establish geometric and kinematics setup of the support shoes. This setup will position the workpiece at the most stable work-holding stability and the minimum lobing generation condition in the grinding process.

The second objective of the present invention is to provide: (i) a flexible rear-shoe structure to increase the absolute stability of the rounding process, (ii) an active filtering structure to filter out the high frequency waviness, (iii) a self-lubricated structure to reduce the heat generation in the contact area between the workpiece and rear shoe.

The third objective of the present invention is to provide a visual sensor to monitor and control overheat at the contact areas of the workpiece with the grinding wheel and rear shoe.

The fourth objective of the present invention is to provide a phase-precession algorithm to suppress the lobing and waviness generation on the workpiece.

In order to achieve the above-mentioned objectives, the present invention includes a motion control device to control the movement of two support shoes, which is attached on the mounting plate, a specially-designed flexible rear shoe of unique material and structure which is mounted on the plate. An infrared CCD camera is setup in front of the mounting plate. A/D, D/A converters between the sensors and CPU processors are used for sensing and control. Finally a software package is developed to implement the phase-precession algorithm. User interface is employed for on-line-graphical display of the workpiece profile and control results.

Although this invention is designed for shoe centerless grinding, its principle and methodology can be applied to any similar process.

DETAILED DESCRIPTION OF A PREFERRED EMBODIMENT

With reference to the drawings, an embodiment of the present invention will be explained hereinafter.

Figure 1:
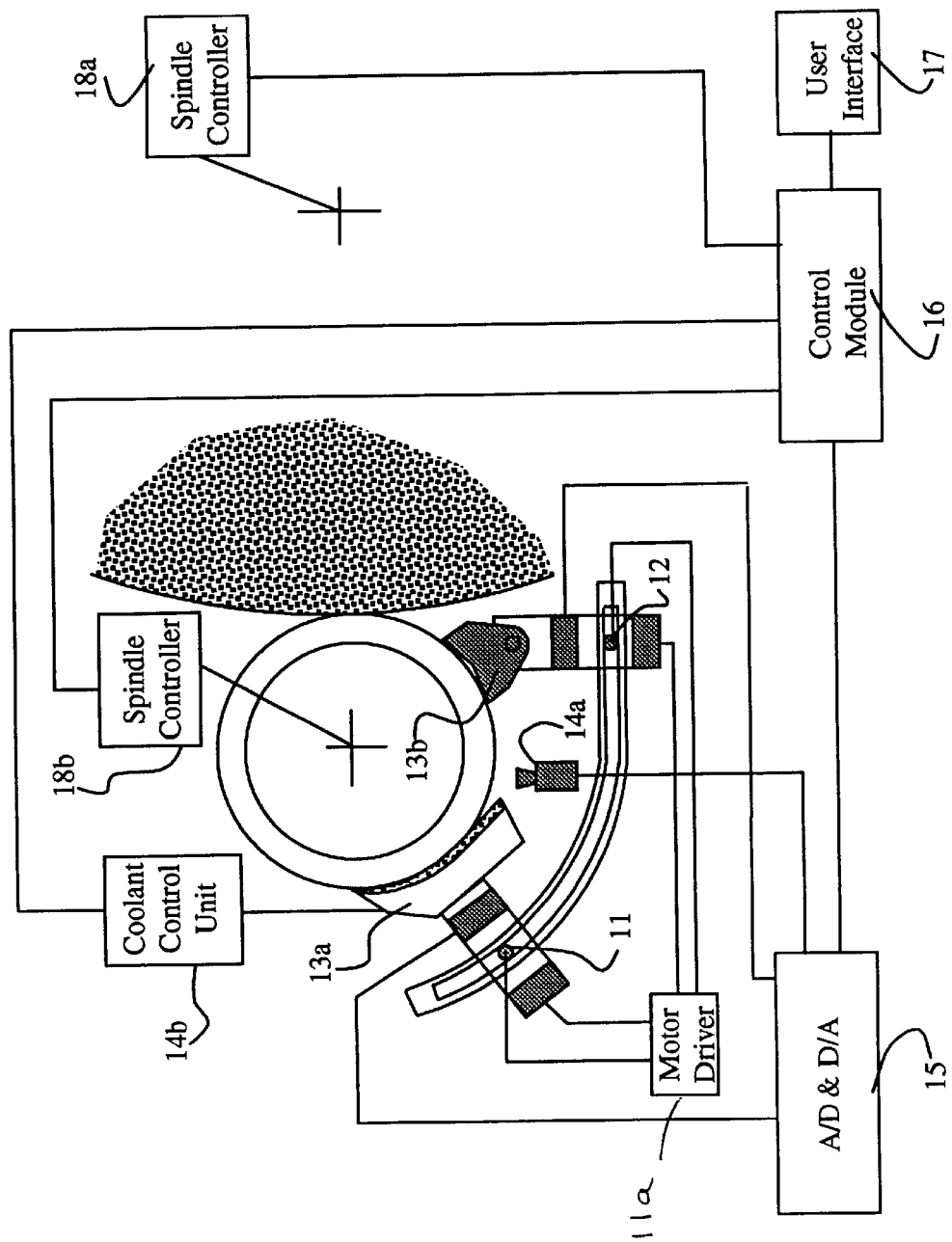
FIG. 1 is a schematic diagram of an embodiment of the present invention for lobing and thermal-damage control in shoe centerless grinding.

In FIG. 1, an apparatus embodying the present invention is indicated generally by the reference numbers. Number 11 and 12 indicate a pair of motion devices, powered by motor driver 11a, that control the movement of two supporting shoes, and number 13a is a special rear shoe which is used for supporting the workpiece and suppressing the lobing and waviness. Number 13b is the front shoe in centerless grinding. Number 14a is a camera-based monitoring system, which is installed in front of a mounting plate. Number 14b is a control unit for a cooling device. Number 15 is the hardware and software interface of control module number 16. Number 17 is the user interface. Numbers 18a and 18b are the grinding wheel speed controller and the workpiece speed controller respectively.

Figure 2:
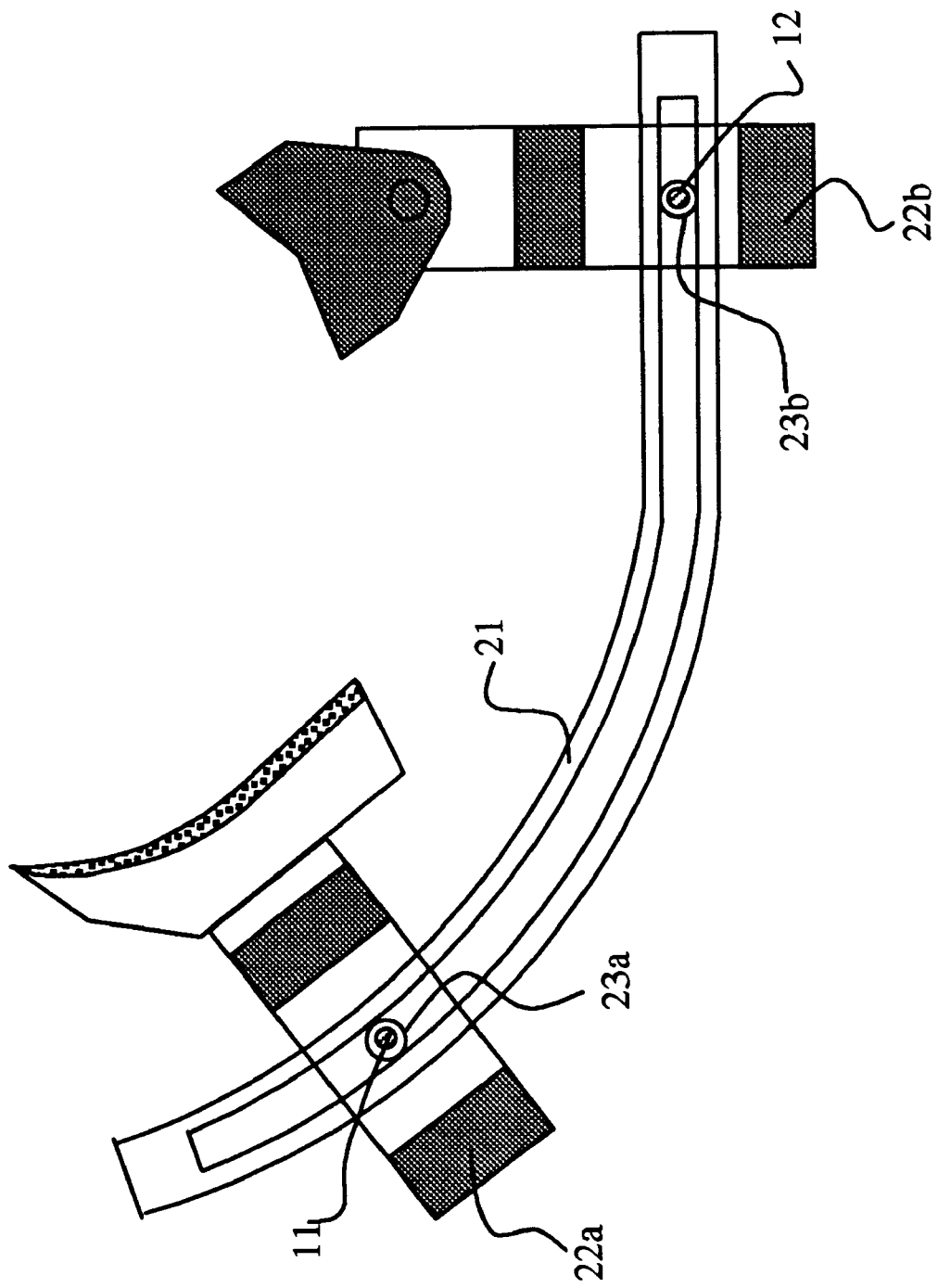
FIG. 2 is a more detailed illustration of an automatic shoe setup device in the apparatus of FIG. 1.

FIG. 2 illustrates the automatic shoe setup device in the apparatus of FIG. 1, which includes 1. Two step motors 11 and 12 with the mechanical arrangement to setup shoe angles;

2. The magnetic intensity setup, workpiece speed setup and the feedrate setup through control-module;
3. Curved slot 21 for shoe setup;
4. Two piezo-motors 22a and 22b to setup the workpiece center.

Figure 3:
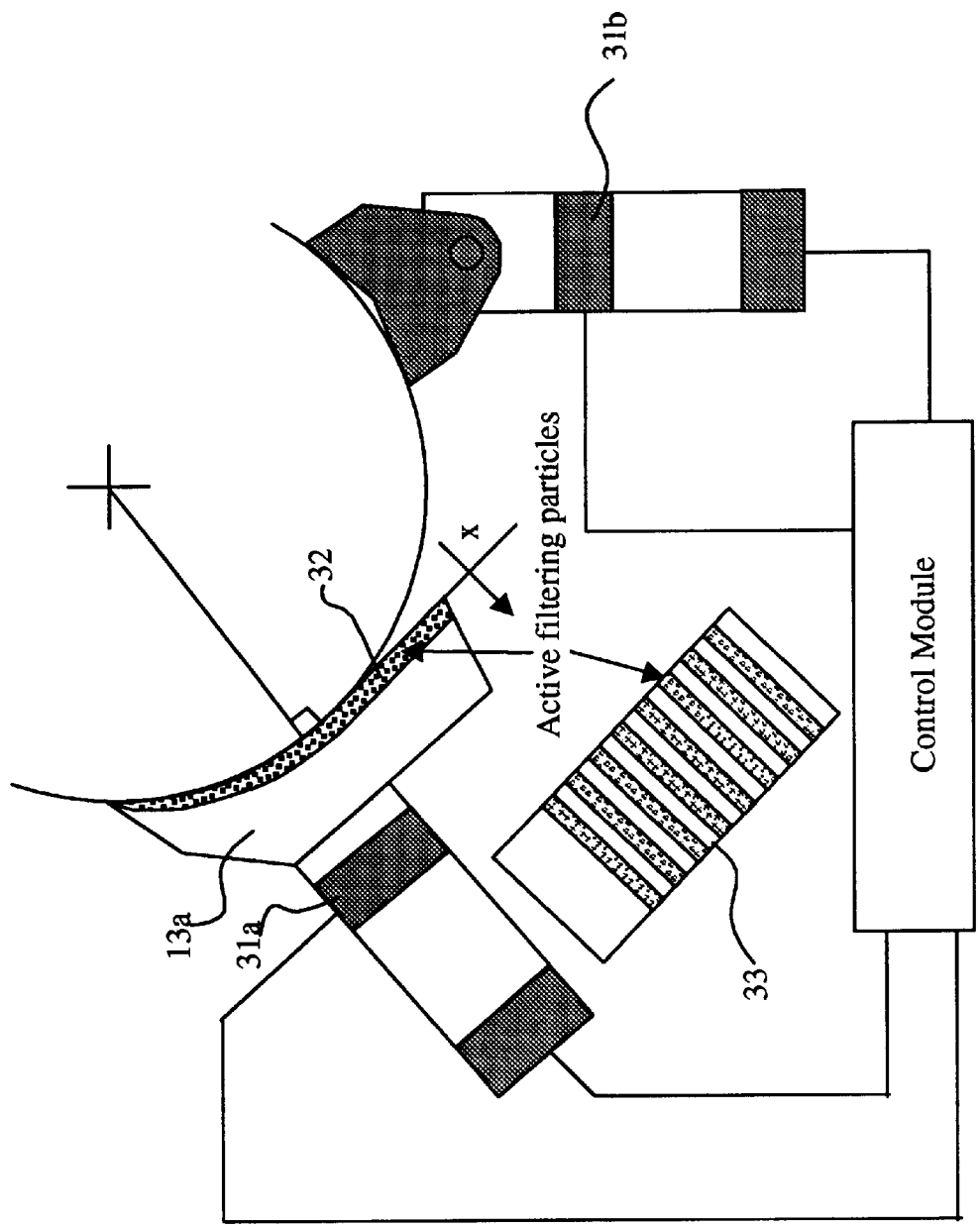
FIG. 3 is a more detailed schematic diagram of the flexible rear shoe structure in the apparatus of FIG. 1.

In FIG. 3, auto-setup devices are provided to regulate the geometric parameter of the shoe centerless grinding, which include:
1. Sandwiched force sensors 31a and 31b installed in two support shoes, to measure the magnitude and frequency of the grinding forces;
2. A flexible rear-shoe structure 13a to increase the absolute stability of the rounding process;
3. An active filtering structure 32 to filter out the waviness with higher frequency;
4. A self-lubricated structure 33 to reduce the heat generation between the workpiece and rear shoe.

Figure 4:
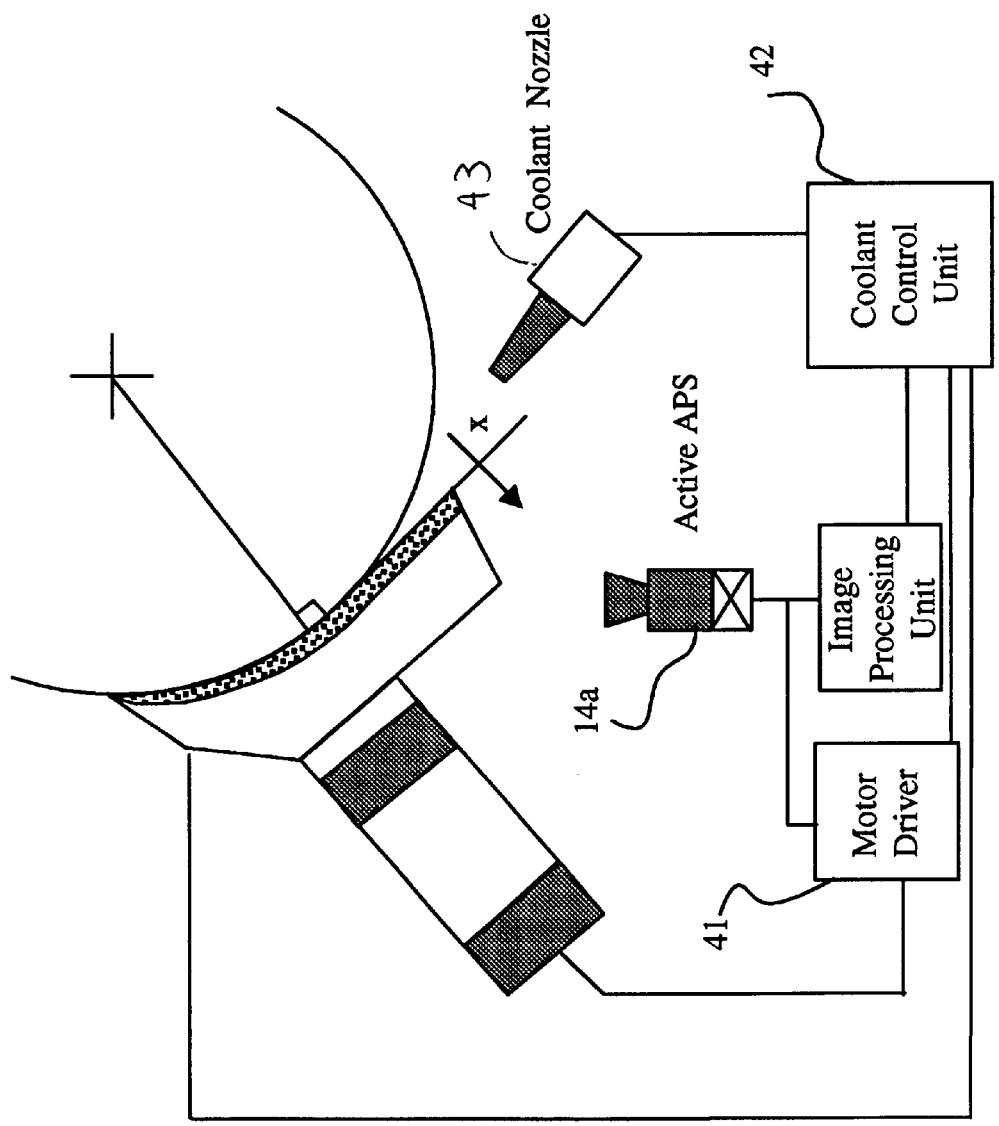
FIG. 4 is a more detailed schematic diagram of the vision-based temperature monitoring and control in the apparatus of FIG. 1.

In FIG. 4, a temperature control and monitoring device is provided, which includes:
1. An infrared camera or infrared temperature sensor 14a to detect the temperature at the contact area;
2. A measurement loop 41 to record temperature;
3. A control unit 42, to deliver coolant to the rear-shoe 13a, via a coolant nozzle 43, which has a self-lubricated fluid input and an external coolant input.

Figure 5:
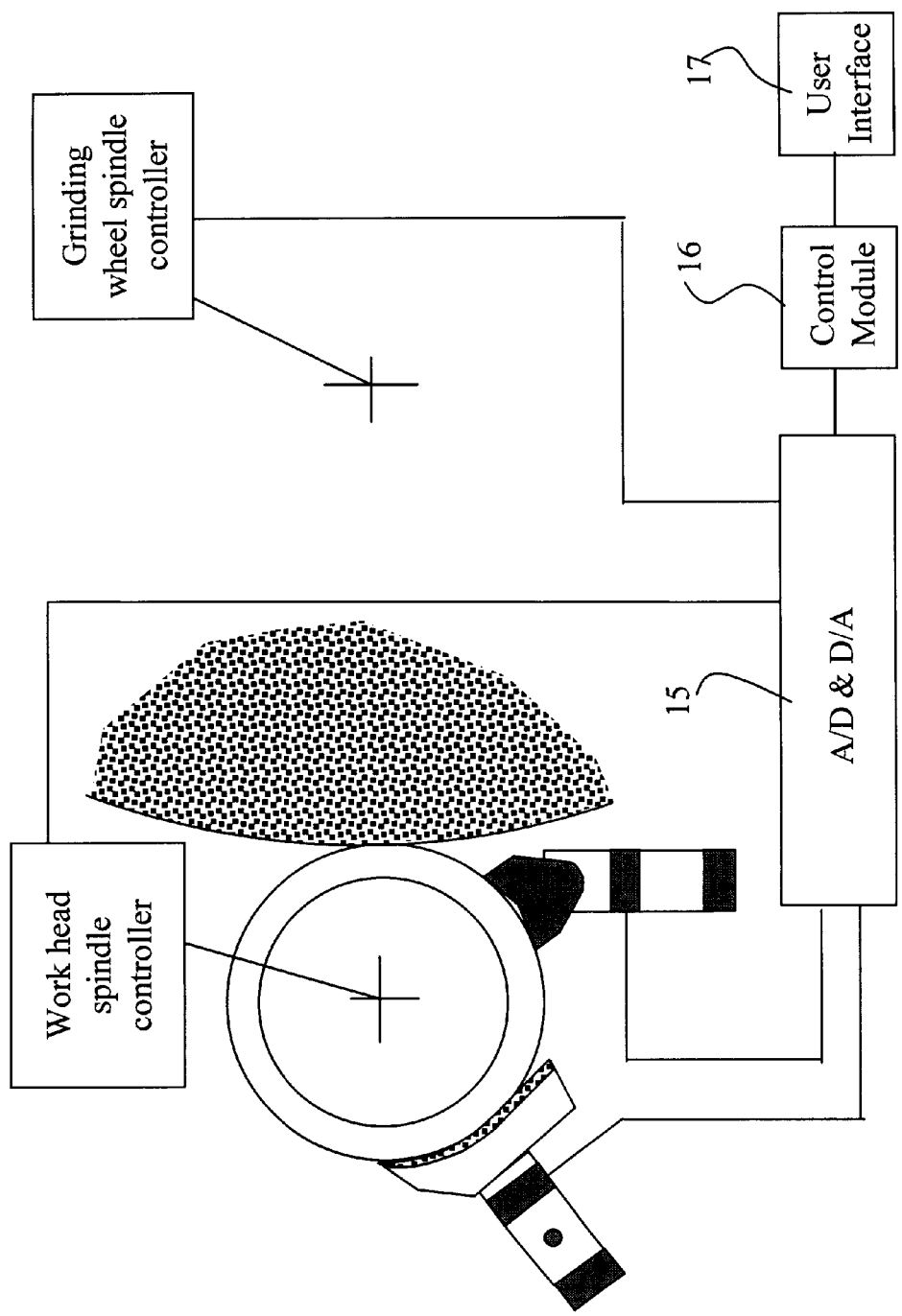
FIG. 5 is a more detailed schematic diagram of the frequency precession control algorithm and apparatus in the apparatus of FIG. 1.

In FIG. 5, device 15 controls the grinding speed and generates the phase precession to suppress the lobing and high frequency waviness. This control includes: (1) setting up T-ratio to be an integer, producing a marginally stable rounding process; (2) adjusting the shoe angle combination to obtain desired threshold lobing frequency; (3) setting up grinding-wheel-to-workpiece speed ratio, T-W ratio, as follows:

$$\frac{n_s}{n_w} > \frac{1}{2\pi} f\left[\frac{T_2}{T_1}, (\pi - \beta)\right] + \varphi$$

where φ is an angle defining the possible unstable zone.

The following outlines the control procedure of this apparatus. Before a grinding operation, the calibration will be performed first to determine the current position of the rear shoe 13a and front shoe 13b. As soon as the operating parameters are put into the control module 16 through the user-interface 17, the control module 16 will control stepmotor 11 and 12 to move rear shoe and front shoe respectively to complete the shoe angle set-up. Through this movement, the workpiece center position is also set-up. After that, the piezo-motors 22a and 22b will regulate the workpiece center offset so that the workpiece center is always along the bisector of the angle between two shoes during grinding process. After the set-up is finished, positioning clamps 23a for the rear-shoe 13a and 23b for the front shoe 13b will be fastened to fix the position.

During grinding, the flexible rear shoe 13a will be deformed to fit the workpiece profile. When any irregularity exists on the workpiece past the rear shoe, this irregular error will be removed by the lapping surface, which is the covering on the rear shoe.

While grinding, the camera 14a is used to monitor the temperature distribution on the contact area between the workpiece and grinding wheel. When the temperature is higher than the threshold value, the coolant control unit 42 will start the cooling device 43.

During the grinding process, the control module 16 will receive a feedback signal from the force sensors 31a, 31b. Based on the frequency of the feedback signals, the lobing frequency will be detected and then the phase precession will be started by slowly increasing the grinding wheel speed (or workpiece speed) in a stable direction. As soon as the precession frequency approaches the unstable window, the grinding wheel speed will be decreased by using the reverse frequency precession.

What is claimed is:

1. An apparatus for controlling lobing and thermal-damage in centerless grinding, comprising:

first means for providing an automatic controlled supporting device by which a periphery support of cylindrical workpieces of varying sizes is auto-formed in a work-holding stability status;

second means for providing a flexible curved shoe structure for cradling a portion of a periphery of the cylindrical workpiece with an active-filtering mechanism by which a high frequency lobing is filtered out during a grinding process of a curved peripheral surface of the cylindrical workpiece and a lubricating material covering on a rear shoe provides a lubricating function to reduce heat over a contact area;

third means for providing an on-line vision-based temperature control and monitoring device by which overheating on the workpiece is regulated; and fourth means for providing an on-line phase precession lobing control algorithm by which lobing is suppressed in a rounding process.

2. An apparatus as defined in claim 1, further comprising an auto-setup device to setup a geometric parameter of shoe centerless grinding, the auto-setup device including:

two step motors to setup shoe angles;

two piezo-motors to setup a workpiece center; and a control module for a magnetic intensity setup, workpiece speed setup and feedrate setup.

3. An apparatus as defined in claim 1, further comprising a flexible rear-shoe structure including:

sandwiched force sensors in two support shoes to measure magnitude and frequency of a grinding force;

a flexible rear-shoe structure to increase absolute stability of a rounding process;

an active filtering structure to filter out high frequency waviness; and a lubricating structure to reduce heat in a contact area between a workpiece and a rear shoe.

4. An apparatus as defined in claim 1, wherein the temperature control and monitoring device includes:

one of an infrared camera and infrared temperature sensor to detect a temperature at a contact area;

a measurement loop to record temperature; and a control loop to place coolant into the contact area between a workpiece and a rear shoe.

5. An apparatus as defined in claim 1, further comprising a lobing controller by frequency precession for providing stable and unstable window determination based on detected force frequencies, for determining a T ratio by shoe angle setup based on an initial workpiece condition, determining a W ratio by feedback force frequency, and for continuously regulating grinding wheel speed (or workpiece speed) to generate phase precession in a stabilizing direction up to an edge of a stable window.

* * * * *